Patented Oct. 14, 1947

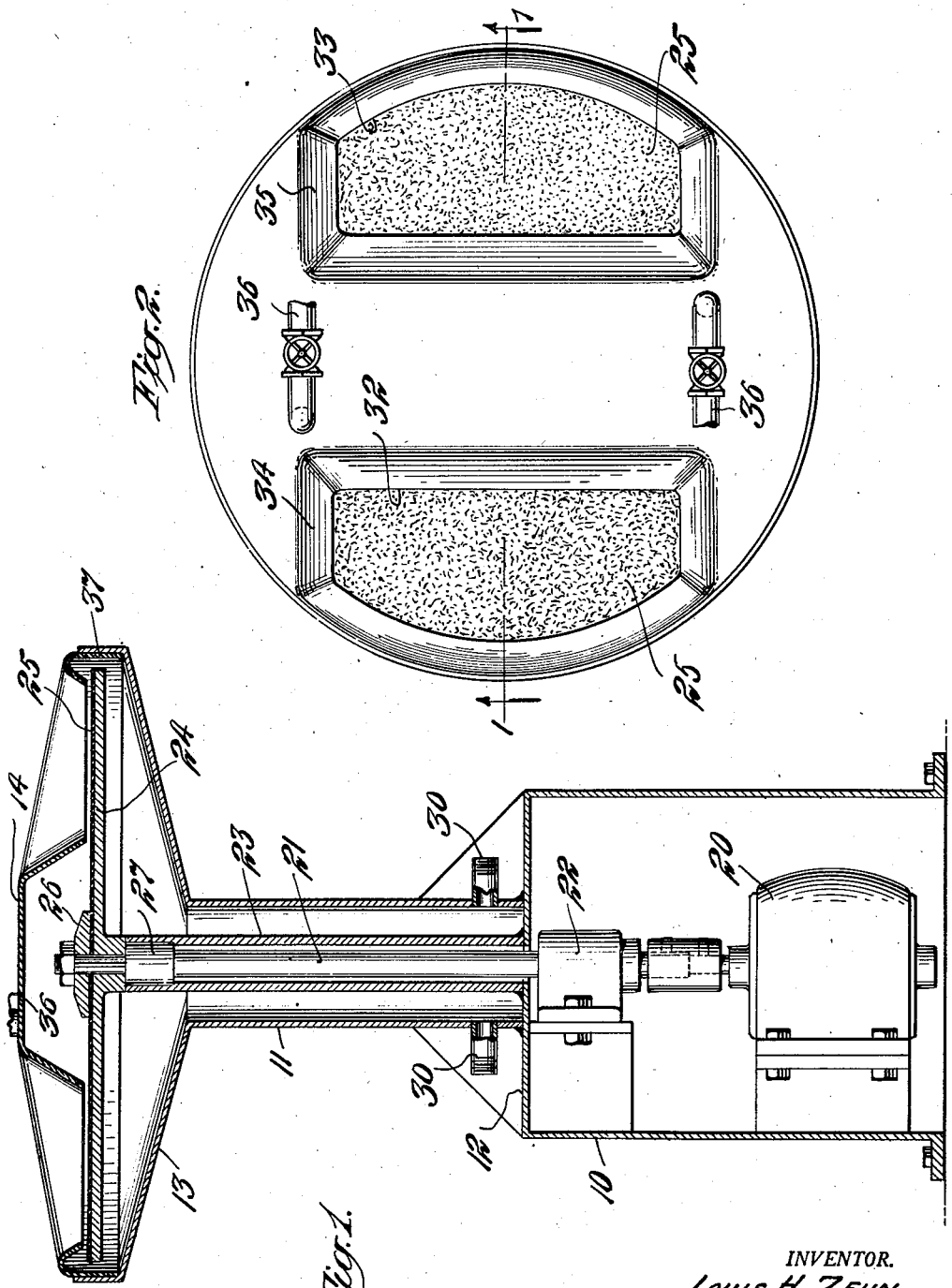

2,428,903

UNITED STATES PATENT OFFICE 2,428,903

ABRADING DISC SKIN REMOVING MACHINE

Louis H. Zeun, Naugatuck, Conn., assignor to Peter Paul, Inc., Naugatuck, Conn., a corporation of Delaware Application February 11, 1944, Serial No. 522,023

2 Claims. (Cl. 146—49)

This invention relates to a machine for removing the skin from coconuts or similar objects.

After the coconut is removed from the husk and shell there is a thin dark skin covering and closely adhering to the meat. In the past this skin has been pared off with knives but even with the exercise of care the parer removes considerable quantities of the meat. Great quantities of coconut meat are thus wasted.

Moreover, it is not practical to use the usual skin paring or removing machines on the market due to the nature of the coconut. Coconuts are hollow and have water inside and are easily broken. Also, the machines on the market are not practical since it is impossible to remove the skin without also removing a considerable portion of the meat.

The invention has for its salient object to provide a simple and practical machine for easily and quickly removing the skin from coconuts.

Another object of the invention is to provide a machine so constructed that the operator can manually control the removal of the skin.

Further objects of the invention will appear from the following specification taken in connection with the drawings which form a part of this application, and in which Fig. 1 is a vertical sectional elevation showing a machine constructed in accordance with the invention, this view being taken substantially on line I—I of Fig. 2; and Fig. 2 is a top plan view of the structure shown in Fig. 1.

In the particular embodiment of the invention illustrated, there is shown a machine comprising a housing 10 having a vertical, substantially cylindrical casing 11 secured to the upper surface 12 of the housing. At the upper end of the casing 11 there is secured a casing comprising a conical lower portion 13 and a cover or upper portion 14.

The housing 10 has mounted therein a motor 20 to which is secured a motor shaft 21 which extends upwardly through a suitable bearing 22 and through a sleeve 23 which is secured to the upper surface 12 of the housing. At the upper end of the shaft 21 there is mounted a disk 24 having a surface 25 of suitable abrasive material, such as carborundum. The disk is clamped at 26 to the upper end of the shaft 23 and a suitable thrust bearing 27 is provided in the upper end of the sleeve 23.

Nipples 30 are provided in the lower portion of the cylindrical casing 11.

The cover 14 has formed therein openings 32 and 33 having inclined margins 34 and 35. Pipes 36 for supplying water to the surface 25 through the cover 14 is also provided, as shown in Fig. 2.

This machine was designed particularly for removing the skin from coconuts and before the skin is removed the coconut is cut into sections or segments. These sections are then held by the operator against the surface 25, the sections being inserted through the openings 32, 33. Thus the abrasive surface effectively removes the skin from the coconut and the coconut section can be so tilted and manipulated that all of the skin will be removed therefrom without endangering the hands of the user.

It will be noted that the outer periphery of the disk 24 and abrasive surface 25 is spaced from the inner surface of the flange 37 of the cover 14. Thus the material removed from the surface will be forced outwardly by centrifugal force and will drop through the space and through the portion 13 of the upper housing and the vertical casing 11. This material can be removed through the nipples 30, 30.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A machine for removing the skin from coconuts, comprising a disk rotatable in a substantially horizontal plane and having an abrasive upper surface, means for rotating the disk, a relatively shallow casing surrounding and spaced from the periphery of the disk, said casing having a cover above the disk provided with elongated openings offset from the center of rotation of the disk to receive the curved outer surfaces of coconut segments to be skinned, each opening being bordered by a downwardly converging inclined rim or marginal portion adapted to support and guide the segment, said rims or marginal portions extending approximately to the abrasive surface of the disk, means for conducting water through the casing cover to the upper surface of the disk, and means for conducting water and abraded skin from the lower end of the casing.

2. A machine for removing the skin from coconuts, comprising superposed casings, a motor in the lower casing, a sleeve sealed at its lower end to the upper end of the lower casing and extending upwardly through the upper casing, a rotary shaft in the sleeve driven by said motor, an abrasive disk on the upper end of the shaft, a head on the upper end of the upper casing surrounding the abrasive disk, a cover on the casing head over the disk, said cover having elongated openings offset from the axis of rotation of the disk through which coconut segments can be inserted and held against the disk, each opening being bordered by a downwardly converging inclined rim or marginal portion adapted to support and guide the segment, said rims or marginal portions extending approximately to the abrasive surface of the disk whereby the segments may be supported on said rims or marginal portions while held in engagement with the abrasive surface of the disk, and means for conducting water to the upper surface of the disk, said upper casing having an opening to permit removal of the skin and water therefrom.

LOUIS H. ZEUN.

REFERENCES CITED

The following references are of record in the file of this patent:

UNITED STATES PATENTS

| Number | Name | Date |
|---|---|---|
| 1,481,547 | Garrette | Jan. 22, 1924 |
| 1,584,066 | Zouvelos | May 11, 1926 |
| 1,445,867 | Binder | Feb. 20, 1923 |
| 1,838,210 | Bost | Dec. 29, 1931 |
| 1,645,516 | Benninger | Oct. 18, 1927 |
| 1,923,806 | Anstiss | Aug. 22, 1933 |
| 2,180,877 | Lorenzen | Nov. 21, 1939 |

FOREIGN PATENTS

| Number | Country | Date |
|---|---|---|
| 18,188/34 | Australia | June 27, 1934 |